United States Patent
Holmes et al.

(10) Patent No.: US 8,473,590 B2
(45) Date of Patent: Jun. 25, 2013

(54) SYSTEM AND METHOD FOR THE CONFIGURATION OF NETWORK DEVICES

(75) Inventors: Bruce A. Holmes, Austin, TX (US);
Joseph D. DeNiro, Austin, TX (US);
Joseph B. Farrell, Austin, TX (US);
Travis L. Hart, Jr., Austin, TX (US);
Mohana R. Mullapudi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1006 days.

(21) Appl. No.: 11/332,130

(22) Filed: Jan. 13, 2006

(65) Prior Publication Data

US 2007/0165539 A1    Jul. 19, 2007

(51) Int. Cl.
*G06F 15/173* (2006.01)
*G06F 15/16* (2006.01)
*G06F 15/177* (2006.01)
*H04L 12/28* (2006.01)
*H04L 12/50* (2006.01)

(52) U.S. Cl.
USPC ........... 709/223; 709/220; 709/222; 709/225; 709/226; 709/227; 709/228; 709/229; 370/254; 370/255; 370/386; 370/401

(58) Field of Classification Search
USPC ................. 370/229–258, 401, 386–388, 341; 709/217–229
See application file for complete search history.

(56) References Cited

U.S. PATENT DOCUMENTS

| | | | |
|---|---|---|---|
| 5,964,837 A * | 10/1999 | Chao et al. | 709/224 |
| 6,052,725 A * | 4/2000 | McCann et al. | 709/223 |
| 6,314,516 B1 | 11/2001 | Cagle et al. | |
| 6,370,586 B2 * | 4/2002 | Davis et al. | 709/244 |
| 6,490,255 B1 * | 12/2002 | Kiriha et al. | 370/254 |
| 6,578,186 B1 * | 6/2003 | Armstrong et al. | 716/16 |
| 6,684,241 B1 * | 1/2004 | Sandick et al. | 709/220 |
| 6,724,757 B1 * | 4/2004 | Zadikian et al. | 370/388 |
| 6,760,688 B2 * | 7/2004 | Suzuki et al. | 702/188 |
| 6,775,262 B1 * | 8/2004 | Skog et al. | 370/349 |
| 6,963,909 B1 * | 11/2005 | Huey et al. | 709/222 |
| 7,409,709 B2 * | 8/2008 | Smith et al. | 726/15 |
| 7,533,166 B2 * | 5/2009 | Beyda | 709/224 |
| 7,594,106 B2 * | 9/2009 | Smith et al. | 713/150 |

(Continued)

FOREIGN PATENT DOCUMENTS

EP    1014622 A2 *    6/2000

OTHER PUBLICATIONS

EtherFast® Wireless Access Point + Cable/DSL Router with 4-Port Switch, 2001, Linksys.*

*Primary Examiner* — Ian N Moore
*Assistant Examiner* — Kai Chang
(74) *Attorney, Agent, or Firm* — Baker Botts L.L.P.

(57) ABSTRACT

A system and method is disclosed for configuring a network device. The system and method involves a network device that includes an external button for toggling the device between a managed mode and an unmanaged mode. When the device is toggled to a managed mode, an Internet Protocol (IP) address is temporarily assigned to the device and the device may be remotely configured. After configuration, the device can be returned to an unmanaged state, and the IP address assigned to the device is cleared. During the period that the device is in a managed state, an external indicator on the device is turned on to confirm that the device is in a managed state.

12 Claims, 4 Drawing Sheets

U.S. PATENT DOCUMENTS

| | | | |
|---|---|---|---|
| 8,149,808 B2* | 4/2012 | Yoneda et al. | 370/341 |
| 2002/0083337 A1* | 6/2002 | Welcher et al. | 713/201 |
| 2002/0161924 A1* | 10/2002 | Perrin et al. | 709/240 |
| 2006/0067343 A1* | 3/2006 | Tagawa et al. | 370/401 |
| 2007/0025372 A1* | 2/2007 | Brenes et al. | 370/401 |

* cited by examiner

SYSTEM AND METHOD FOR THE CONFIGURATION OF NETWORK DEVICES

TECHNICAL FIELD

The present disclosure relates generally to computer systems and information handling systems, and, more particularly, to a system and method for the configuration of network devices.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may comprise a network device that is remotely managed using an Internet Protocol (IP) communications interface, such as the Simple Network Management Protocol (SNMP), HTTP, or Telnet. One example of such an IP-managed network device is a network switch, which bridges or routes communications between the various devices (client terminals, servers, Internet portal, etc.) of a computer network. One difficulty of managing IP-managed devices is the necessity of assigning IP addresses to each device, especially when multiple devices are deployed at the same time. Although IP addresses can be assigned to each network device, assigning an IP address to each IP-managed network device can be a costly endeavor. In addition, when IP address are assigned to IP-managed devices on a default basis, there is a risk that two or more devices will be assigned the same IP address, resulting in an IP address conflict, which can cause difficulty, as the user will be challenged to know which device has been connected for the sake of configuration. In addition, an IP address could be assigned to a device that does not require later configuration. Following the initial configuration of the device, it is often desirable to leave the device in an unmanaged state in which the device does not have an assigned IP address.

SUMMARY

In accordance with the present disclosure, a system and method is disclosed for configuring a network device. The system and method involves a network device that includes an external button for toggling the device between a managed mode and an unmanaged mode. When the device is toggled to a managed mode, an Internet Protocol (IP) address is temporarily assigned to the device and the device may be remotely configured using that address. If desired, the device can be returned to an unmanaged state, and the IP address assigned to the device is cleared. During the period that the device is in a managed state, an external indicator on the device is turned on to confirm that the device is in a managed state.

The system and method disclosed herein is technically advantageous because it provides a technique for temporarily assigning an IP address to device that is capable of being managed remotely through an IP communications interface. When the IP address is no longer needed, the IP address is cleared and the expense of permanently maintaining the IP address for the device is avoided. The system and method described herein is also technically advantageous because the external button provides the user with an easily accessible trigger for causing the device to transition between an unmanaged and a managed state.

In addition, the use of an external indicator provides the user or administrator of the system with a notification and confirmation that the device is currently in a managed state. As such, the user or administrator of the system can visually determine if the device is in a managed state. The system and method described herein is not limited in its use to Ethernet switches. Rather, the system and method disclosed herein may be used with any device that may be assigned an IP address and remotely configured. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
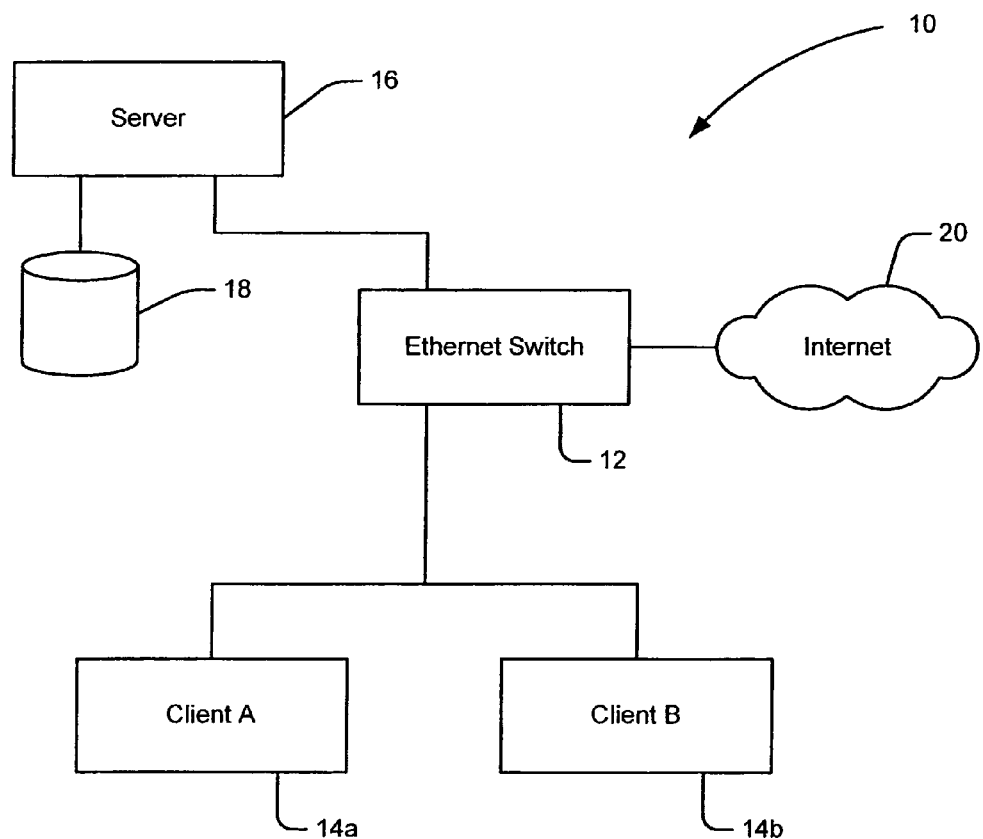
FIG. 1 is a diagram of a computer network.

Information handling systems may be arranged and connected to one another in a computer network. FIG. 1 is a diagram of a computer network, which is indicated generally at 10. Network 10 includes clients 14, which are coupled to an Ethernet switch 12. Switch 12 is also coupled to an Internet gateway 20 and a server 16, which is in turn coupled to a storage resource 18. Switch 12 is an intelligent hub that connects the devices and gateways of the network, and transmits communication between the various devices and gateways of the network. Switch 12 is an example of a device that is remotely configurable through an IP communications interface.

Figure 2:
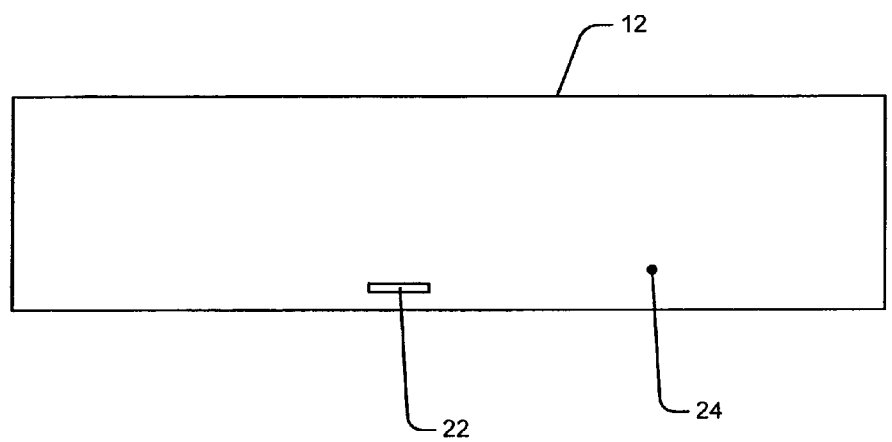
FIG. 2 is a side view of a switch.

Switch 12 operates in two modes, a managed mode and an unmanaged mode. FIG. 2 is a side view of a switch 12. As shown in FIG. 2, switch 12 includes an external button 24 that can be pressed or toggled to move the switch into a managed or unmanaged mode. The external housing of switch 12 includes an LED indicator 22 that indicates, when the LED is lit, that the device is in a managed mode. To toggle the device between a managed and an unmanaged mode, the user simply presses or toggles button 24. Shown in FIGS. 3A and 3B are flow diagrams depicting the steps for toggling an IP-managed device, like switch 12, between a managed and an unmanaged mode and for configuring the device during the period that the device is in a managed mode.

Figure 3A:
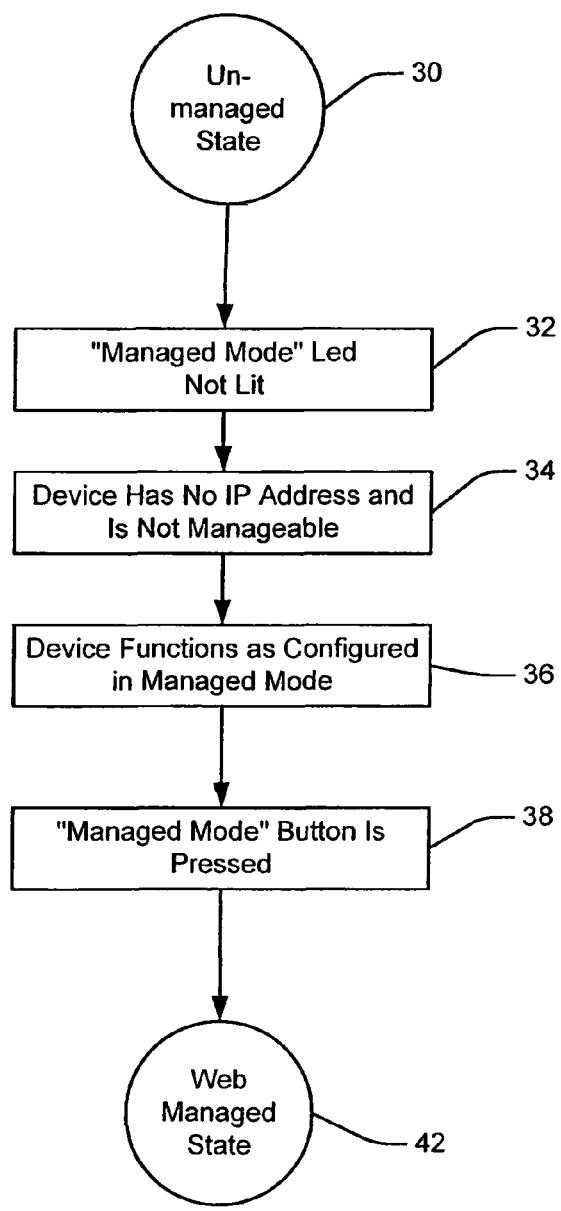
FIG. 3A is a flow diagram of steps for transitioning an IP-managed device from an unmanaged state to a managed state.

FIG. 3A includes a series of steps for transitioning an IP-managed device from an unmanaged state to a managed state. At step 30 of FIG. 3A, the device is in an unmanaged state. In an unmanaged state, the device cannot be configured through an IP communications interface. Because the device is in an unmanaged state, the LED 22 is not lit (step 32) and the device does not have an IP address and is not manageable (step 34). As depicted at step 36, the device operates as it was most recently configured when the device was in a managed state. Because the device is in an unmanaged state, an IP address need not be assigned to the device. At step 38, button 24 is pressed. The device then enters an IP-managed state, as indicated at step 42 in FIG. 3A and FIG. 3B.

Figure 3B:
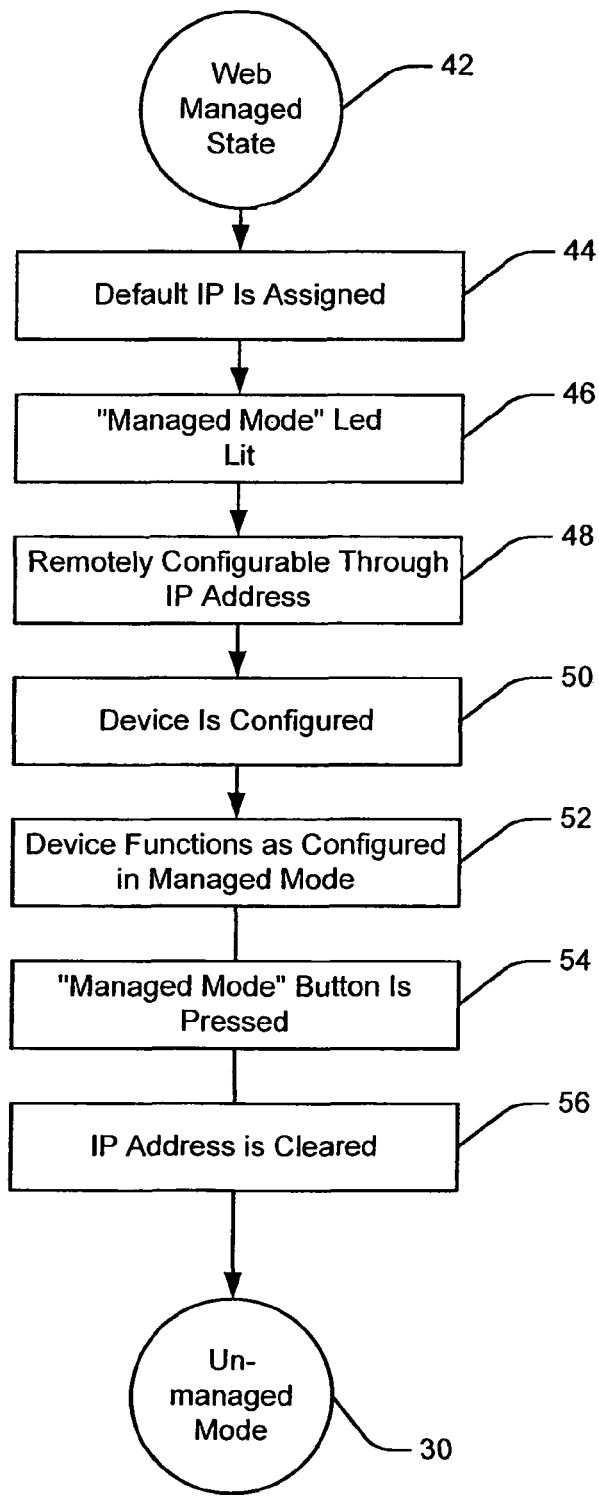
FIG. 3B is a flow diagram of steps for transitioning an IP-managed device from a managed state to an unmanaged state.

FIG. 3B includes a series of steps for transitioning the device from a managed state to an unmanaged state. Following the toggling of the external button, the entry of the switch into an IP-managed state begins at step 42. The toggling of button 24 causes the switch 12 to execute a routine to request an IP address from another device in the network that is responsible for assigning IP addresses. At step 44, an IP address is assigned to the device. After the external button is toggled and an IP address is assigned to the device, the external indicator is lit at step 46. At this point, as indicated by step 48, the device is manageable and can be configured using an IP communications interface. At step 50, the device is configured and the configuration is saved. At step 52, the device begins to function as configured. Following the completion of the configuration steps, external button 24 is toggled at step 54 to cause the device to exit the managed state. At step 56, the IP address of the device is cleared, and the device returns to an unmanaged state, as indicated at step 30 in FIGS. 3A and 3B.

The system and method described herein provides a technique for temporarily assigning an IP address to a device that is capable of being managed remotely through an IP communications interface. When the IP address is no longer needed, the IP address is cleared and the expense of permanently maintaining the IP address for the device is avoided. The use of the external button for toggling the system for entering an exiting a managed state provides the user of the device with an easily accessible method for causing the device to transition between an unmanaged and a managed state. In addition, the use of an external indicator provides the user with a notification and confirmation that the device is currently in a managed state. The system and method described herein is not limited in its use to Ethernet switches. Rather, the system and method disclosed herein may be used with any device that may be assigned an IP address and remotely configured. Although the present disclosure has been described in detail, it should be understood that various changes, substitutions, and alterations can be made hereto without departing from the spirit and the scope of the invention as defined by the appended claims.

What is claimed is:
1. An information handling system, comprising:
an external button that can be toggled between a first position and a second position, wherein the first position corresponds to a first state of the information handling system, and the second position corresponds to a second state of the information handling system;
an external indicator associated with one of the first state and the second state;
wherein placement of the button in the first position causes the information handling system to enter the first state, wherein entering the first state causes the information handling system to automatically request and be assigned a temporary Internet Protocol address for a remote configuration of the information handling system; and
wherein placement of the button in the second position causes the information handling system to enter the second state in which:
the information handling system does not have the temporary Internet Protocol address;
the information handling system is not remotely configurable; and
the information handling system operates based, at least in part, on the remote configuration set when the information handling system is in the first state.
2. The information handling system of claim 1, wherein the external indicator is lit when the information handling system is in the first state and is remotely configurable.
3. The information handling system of claim 1, wherein the information handling system enters the first state by executing a routine to request the assignment.
4. The information handling system of claim 1, wherein the information handling system enters the second state by executing a routine to clear the temporary Internet Protocol address associated with the information handling system.
5. A method for configuring a computer system, comprising:
toggling an external button on the computer system, wherein the toggling of the external button causes the computer system to transition from an unmanaged state to a managed state, wherein the transition causes the computer system to automatically request and receive an assignment of a temporary Internet Protocol address to the computer system to enable a remote configuration of the computer system;
configuring the computer system; and
toggling the external button on the computer system to cause the computer system to transition from the managed state to the unmanaged state in which the computer system is not remotely configurable, the computer system operates based, at least in part, on the remote configuration set when the computer system is in the man- aged state, and the computer system does not have the temporary Internet Protocol address.

6. The method for configuring the computer system of claim 5, wherein the transition from the unmanaged state to the managed state involves turning on an external indicator on the computer system to indicate that the computer system is in the managed state.

7. The method for configuring the computer system of claim 5, wherein the transition from the managed state to the unmanaged state involves turning off an external indicator on the computer system to indicate that the computer system is in an unmanaged state.

8. A method for configuring a computer system, comprising:
   receiving at the computer system a signal that the computer system is to transition from an unmanaged state to a managed state;
   transitioning from an unmanaged state to a managed state, wherein the step of transitioning from the unmanaged state to the managed state causes the computer system to automatically request that a temporary Internet Protocol address be assigned to the computer system to enable a remote configuration of the computer system;
   configuring the computer system through the assigned temporary Internet Protocol address;
   receiving at the computer system a signal that the computer system is to transition from the managed state to the unmanaged state; and
   transitioning from the managed state to the unmanaged state in which the computer system is not remotely configurable and the computer system operates based, at least in part, on the remote configuration set when the computer system is in the managed state;
   wherein the step of transitioning from the managed state to the unmanaged state comprises clearing the temporary Internet Protocol address assigned to the computer system.

9. The method for configuring the computer system of claim 8, wherein the step of transitioning from the unmanaged state to the managed state comprises turning on an external indicator to identify that the computer system is in the managed state.

10. The method for configuring the computer system of claim 8, wherein the step of transitioning from the managed state to the unmanaged state comprises turning off an external indicator to identify that the computer system is in the unmanaged state.

11. The method for configuring the computer system of claim 8, wherein the step of receiving a signal to transition to the managed state comprises the step of receiving a signal from an external button on the computer system.

12. The method for configuring the computer system of claim 8, wherein the step of receiving a signal to transition to the unmanaged state comprises the step of receiving a signal from an external button on the computer system.

\* \* \* \* \*